Patented July 31, 1951

2,562,488

UNITED STATES PATENT OFFICE 2,562,488

GERMICIDAL REACTION PRODUCTS OF SILVER SALTS AND MONOHYDROXY-MONO-AMINO ALKANES

Walter M. Fuchs, New York, N. Y., assignor, by mesne assignments, to Bactericidal Research, Inc., New York, N. Y., a corporation of New York No Drawing. Application October 6, 1947, Serial No. 778,271

17 Claims. (Cl. 167—22)

This invention relates to new products, particularly to new silver-containing compounds or products having a high germicidal value, and to methods for their production. This application is a continuation-in-part of application Serial No. 738,723 now abandoned, filed 1947 April 1.

Germicides for satisfactory use in the treatment of living tissue or of articles coming in contact therewith, such as rubber goods, textiles, paper, articles made of synthetic resins, bristles, glass or porcelain surfaces and the like, must be characterized by a combination of properties which is difficult to attain, even when resorting to a mixture of substances. Even though many compounds and substances are known which are highly effective germicides, particularly with regard to certain species of bacteria, almost all of them suffer from certain defects. The disadvantages of tincture of iodine, for example, are well known. Other germicides, such as certain phenolic compounds, many inorganic salts and the organic mercurials, although used to a considerable extent for certain purposes are either too selective in their action or too reactive with the product being sterilized to be of more than limited usefulness. In particular, the development of a germicide for use on living tissues, or on articles coming in contact with the skin, such as clothing, bandages, surgical gauze, sponges, brushes, combs and other articles, has offered considerable difficulty and the products presently recommended for these purposes leave much to be desired. Generally speaking, the germicides now available lose their effectiveness within a short time after application and are easily removed by washing so that treatment of an article, such as a textile or a bristle, to give it a degree of self-sterilization over an extended period of time has hitherto not been considered feasible.

It is known that metallic silver and certain of the water-soluble silver salts are, under certain conditions, effective germicides. Thus, it has been proposed to sterilize water for drinking purposes by the use of a minute quantity of colloidal silver. Strong aqueous silver nitrate solution has also been used to a limited extent where contact with the human skin is avoided and where the development of a dark color is not objectionable. Colloidal silver has also been used as a wash for the nasal and associated passages. The use of water-soluble silver salts has heretofore been limited for the reasons given and also because of the fact that when concentrated solutions are used they are irritating to the skin to such an extent as generally to be classed as cauterizing agents. The effectiveness of silver nitrate under the name of "lunar caustic" in the dehorning of animals is well known.

The use of dilute solutions of the water-soluble silver salts has not proved practical because of the precipitation of silver in inactive form from such solutions by chloride ions or by proteins. The water-insoluble silver salts, such as the chloride, bromide, iodide, phosphate, and sulfate can be handled freely in contact with the skin without undue harmful effects, except to cause darkening of the skin upon prolonged contact, but they are of little or no utility as germicides. The utility of collodial silver is limited by the unsightly discoloration of tissues and clothing or other articles with which it comes in contact. The silver ion is generally considered to be relatively non-toxic when compared with many other heavy metal ions and it is apparent that a method or product by means of which full advantage could be taken of the germicidal properties of the silver salts and by means of which the disadvantages hitherto inherent in the use of such salts could be overcome would be of great value.

It is, therefore, an object of the present invention to provide a method for producing a silver-containing germicide.

An additional object of the invention is to provide a method for producing a water-soluble, silver-containing germicidal product not subject to the disadvantages inherent in the heretofore available silver-containing germicides.

An additional object is to provide a method for producing a stable, non-toxic, silver-containing product having a high degree of germicidal effectiveness and substantially non-staining to articles and living tissues with which it comes in contact.

An additional object is to provide a method for preparing a water-soluble germicide from a water-insoluble silver salt.

An additional object is to provide a water-soluble, silver-containing germicide of a high degree of effectiveness and stability.

An additional object is to provide a liquid composition having germicidal properties and containing silver.

A further object is to provide a liquid germicidal composition containing a normally insoluble silver salt.

These and related objects are accomplished readily and economically by mixing together a silver salt and a mono-alkylol amine, preferably under controlled temperature conditions, until the reaction between the silver salt and the mono-alkylol amine has progressed to the desired degree. The resulting product, which is generally a clear solution and which appears to contain a complex compound of the alkylol amine and the silver salt, can then be utilized in a variety of ways. Thus, it can be diluted with water to form a dilute, clear solution having a germicidal effectiveness many times that of phenol. The aqueous germicidal solution so formed, which is included within the scope of the invention, is stable over long periods of time even when exposed to light and can be used freely in treating areas of the human body or articles coming in contact therewith without irritation or cauterizing effect and without substantial staining or darkening of the article or area treated. Fibrous products used in making clothing, underwear and the like, as well as the finished articles made therefrom, when treated as hereinafter described become self-sterilizing to the extent that, when removed from the wearer and tested subsequently for the presence of organisms, they are found to be substantially germ-free.

The reaction product of the silver-salt and alkylol amine can also be incorporated in ointments, salves, unguents, and the like, if desired, and these products then used as germicides. It is also possible, following the method of the invention, to prepare solutions which can be incorporated in aqueous dispersions or latexes of resins which are subsequently coagulated to form articles containing sufficient germicidally active silver compound to become essentially self-sterilizing. Likewise bristles to be used in making brushes can be treated with similar results. Porcelain and other surfaces can be given a degree of self-sterilization as hereinafter described. Solid ingredients such as abrasives, fillers and the like, used in preparing a variety of products can be treated by a modification of the invention and self-sterilizing properties thus imparted to the final products.

A particular modification of the invention contemplates the use of a silver salt which is normally substantially insoluble in water, such as the chloride, bromide, iodide, phosphate or sulfate. By the process of the invention, water-soluble germicidal products are prepared readily from these water-insoluble salts as will be hereinafter described.

Although substantially any mono-alkylol amine can be used in the process of the invention, those having less than five carbon atoms in the alkylol radical are preferred. These amines are, in many instances, readily available commercially and are in convenient liquid form. Mono-alkylol amines having more than about five carbon atoms in the alkylol radical are usually of such a thick syrupy consistency that difficulty is experienced in dissolving the silver salt therein without prolonged agitation. Mono-alkylol amines which can be used include, mono-ethanol amine, beta-hydroxy isopropyl amine, beta-amino-n-propanol, mono-butylol amine, and others.

In treating the silver salt with a mono-alkylol amine it is only necessary to agitate a mixture of the two substances for a short time, preferably until a clear liquid is obtained. This frequently requires not more than from about five to about thirty minutes, depending upon the ratio and amounts of silver salt and amine, the degree of agitation and upon the particular ingredients employed. In some instances, however, the salt dissolves very slowly and may require as long as one to two hours or longer for complete dissolving. It is preferable, but not essential, that the silver salt be in finely divided form. Silver salts which can be used to advantage include water-soluble and water-insoluble organic and inorganic salts, such as the chloride, bromide, iodide, acetate, lactate, benzoate, nitrate, succinate, phosphate, sulfate, and many others. The reaction is generally weakly exothermic and cooling of large batches may be required.

Mixing of the silver salt and mono-alkylol amine is usually carried out at about room temperature, e. g., at from about 10 to 30 degrees C., but higher or lower temperatures can be used, if desired. Mixing may become difficult and the process unduly prolonged due to increase in viscosity of the mono-alkylol amine if the temperature is kept too low. If the temperature is higher than about 50 degrees centigrade, an undesirable reduction reaction with the formation of free silver has been noted in certain instances.

It has been found that the character of the product obtained depends, to some extent, upon the proportion of silver salt and mono-alkylol amine used and also upon the length of time for which the mixture is allowed to stand after solution is complete. Thus, in the case of silver chloride and mono-ethanol amine, when the weight of alkylol amine in the mixture is about seven times the weight of the silver salt, and the mixture is allowed to stand for only about five minutes before being diluted with water, a precipitate of silver chloride is formed when water equal to about one and one-half times the weight of the mixture is added. If, on the other hand, the same mixture is allowed to stand for fifteen minutes, the amount of water which can be added without the formation of a precipitate is at least three times that of the weight of the mixture. When the proportion of amine in the mixture is increased to as much as twelve and one-half times the weight of silver chloride and the mixture allowed to stand for about five minutes, no precipitate is formed upon adding water equal to about ten times the weight of the mixture of salt and amine. When the amount of amine in the solution is not more than about five times the weight of silver salt, a precipitate is formed upon adding water equal to slightly more than the weight of the mixture of salt and amine regardless of how long the mixture is allowed to stand.

Although the character of the product formed upon mixing a silver salt and mono-alkylol amine has not been entirely established, it is thought that initial dissolving of the silver salt is followed by formation of an ammino salt which is easily decomposed by water unless a considerable excess of free mono-alkylol amine is present. The fact that the amount of water which can be added to a particular mixture comprising a water-insoluble silver salt without formation of a precipitate increases with the time the composition is allowed to stand before dilution indicates the more than mere solubility of the silver salt in the mono-alkylol amine is involved. Also, it has been observed that when a water-insoluble silver salt, e. g., silver chloride, is stirred with an aqueous mono-alkylol amine, only traces of the silver salt is dissolved even though the proportions of silver salt, alkylol amine and water in the mixture be the same as in a clear solution obtained by first dissolving the silver salt in the alkylol amine and then diluting with water according to one modification of the method of the invention. Although these phenomena are more easily observed when using a composition comprising a water-insoluble silver salt, there is sufficient evidence to conclude that ammino compounds are also formed when using a water-soluble silver salt and a mono-alkylol amine. Furthermore, it is possible, in some instances at least, to separate from the mixture a substance of constant composition corresponding to such a silver ammino salt. When, for example, silver chloride and mono-ethanol amine are mixed and the clear mixture allowed to stand at room temperature for about an hour, a heavy brownish oil is precipitated upon the addition of chloroform to the mixture. The oil, after washing with chloroform and drying briefly in vacuo, has an analysis corresponding to the formula $Ag(HOC_2H_4NH_2)_2Cl$. The composition of the invention comprises at least two mols of mono-alkylol amine for each chemical equivalent of silver salt. It may be that solutions of the product containing a higher proportion of mono-alkylol amine may contain soluble silver complex compounds containing more than two mols of amine for each chemical equivalent of silver salt.

Aqueous solutions formed by diluting the reacted mixture of silver salt and mono-alkylol amine are, as indicated previously, stable over long periods of time without change in color or substantial formation of insoluble matter. Such solutions are highly germicidal and, particularly in the case of water-insoluble silver salts, are non-cauterizing to living tissues. Solutions containing one per cent of silver chloride, together with ten times its weight of mono-ethanol amine, have been prepared having phenol coefficients of 20 and higher. Generally speaking dilute aquous solutions containing from two to four per cent or less of silver, calculated as silver salt, will be found sufficiently germicidal for most purposes. Silver chloride is precipitated from such a solution by the addition of a few drops either of ten per cent aqueous sodium chloride or ten per cent aqueous silver nitrate indicating that increasing the concentration of either the silver or chloride ion disturbs the equilibrium in the solution. Such a solution can be diluted with an equal volume of many water-soluble organic liquids, such as acetone, ethanol, methanol, propanol and ethylene glycol, but the addition of a large excess of such liquids causes precipitation of silver chloride unless the proportion of ethanol amine in the mixture is increased. In the case of products prepared using highly water-soluble silver salts, such as the nitrate, precipitates are not obtained by adding the organic liquids just mentioned even though corresponding changes in the solution may be caused by the reagents.

It is apparent that the process is capable of considerable variation and such variation is taken advantage of in various ways. Thus, in the treatment of a fabric to impart to it self-sterilizing properties resistant to washing, a water-insoluble silver salt is used and the fabric soaked for a few minutes in the diluted composition. The wet fabric is then squeezed partially dry and washed copiously with water. Under such conditions a silver compound is deposited in insoluble form in the interstices of the fabric or, more probably, adsorbed on the surfaces of the fibers and remains lodged there through many severe washings. Fabrics treated in this manner and containing considerably less than one per cent of silver compound, based on the dry weight of the fabric, have been found eminently satisfactory.

When a dilute germicidal solution is desired using a water-insoluble silver salt, the proportion of amine is increased, e. g., up to fifteen or more times the weight of the silver salt, and a liquid product obtained which can be stored and subsequently diluted to substantially any desired degree with water without substantial formation of a precipitate.

To prepare ointments, salves and the like having germicidal properties, the composition formed by mixing the silver salt and mono-alkylol amine can be incorporated therein in any convenient manner. In the case of such products containing a substantial proportion of water, the silver salt-alkylol amine composition can be diluted with water and the solution used to replace all or a part of the water normally entering into the formulation of the product. Germicidal soaps are prepared by incorporating the silver-containing composition in soap in similar or other convenient manner.

To impart a degree of self-sterilization to the surfaces of water-insoluble objects, the surface can be soaked with an aqueous solution prepared from a water-insoluble silver salt and a mono-alkylol amine containing a relatively small portion of amine and subsequently washed well with water, or with aqueous sodium chloride and then with water. Under such conditions a deposit of high germicidal activity is formed on the surface, but in such small quantity that the appearance of the surface is not altered substantially. In this way the surfaces of hard and soft rubber goods, porcelain, bristles and the like can be treated to render them substantially self-sterilizing even after repeated washing.

Certain advantages of the invention are apparent from the following examples which are given by way of illustration only and are not to be construed as limiting:

EXAMPLE 1

A number of one-gram samples of powdered silver chloride were placed in separate flasks and the flasks divided into series. The same quantity of mono-ethanol amine was placed in each flask in a series, using different amounts in the different series, and the flasks shaken until the silver chloride was all dissolved. The solution in one flask in each series was diluted with water as soon as the sample was dissolved until a cloudiness indicated the beginning of the formation of a precipitate of silver chloride. Another flask in each series was let stand for fifteen minutes after solution was complete and water was then added to it until precipitation began. The same test was repeated with other flasks in each series after 30 and 60 minutes.

In the accompanying Table I there are given the grams of monoethanol amine used per gram of silver chloride and the dilution limit in milliliters of water required to initiate precipitation after varying periods of time.

Table I

| Grams mono-ethanol amine per gram of silver chloride | Dilution limit (ml. water) | | | |
|---|---|---|---|---|
| | Fresh solution | After 15 min. | After 30 min. | After 60 min. |
| 2.5 | 1 | 1.2 | 1.2 | 1.2 |
| 5.0 | 5 | 7 | 7.5 | 7.5 |
| 7.5 | 11 | 25. | 40.0 | 40.0 |
| 10.0 | 45 | (1) | (1) | ² 450.0 |
| 12.5 | (1) | (1) | (1) | (1) |

¹ More than 100 ml.
² Approximately.

By way of comparison, one gram of powdered silver chloride was added to a solution of ten grams of mono-ethanol amine in ninety milliliters of water, the mixture agitated vigorously for one hour and filtered. The filtrate contained only a minute trace of silver.

EXAMPLE 2

One gram of silver chloride was dissolved in ten grams of monoethanol amine by shaking the two together and the clear solution let stand for 30 minutes. It was then diluted with water to a volume of 100 milliliters.

A few drops of ten per cent aqueous sodium chloride solution were added to ten milliliters of the dilute solution. A precipitate of silver chloride was formed. The test was repeated using a few drops of ten per cent aqueous silver nitrate solution instead of the sodium chloride. A precipitate of silver chloride was noted in this case also.

EXAMPLE 3

A ten per cent solution of silver chloride in mono-ethanol amine was prepared. Portions of this solution were mixed with equal volumes of acetone, methanol, ethanol, n-propanol and ethylene glycol. The mixtures remained clear. Upon the addition of a large excess of each of these organic liquids, precipitates of silver chloride were formed.

The experiment was repeated using a one per cent solution of silver chloride in mono-ethanol amine. No precipitate of silver chloride was formed by the addition of a large excess of each of the above water-soluble organic liquids.

A portion of the ten per cent solution of silver chloride in mono-ethanol amine was mixed with an equal volume of chloroform. The mixture remained clear. Upon addition of an excess of chloroform, a heavy, brownish oil separated.

EXAMPLE 4

Two grams of silver chloride was dissolved in five grams of mono-ethanol amine and the solution allowed to stand at room temperature for sixty minutes. Fifty milliliters of chloroform was then added. A heavy, brownish oil separated. The supernatant liquid was decanted and the oil washed three times by decantation with small portions of chloroform. It was then dried for a few moments in a vacuum desiccator. Twenty-five milliliters of water was added to a portion of the dried oil and the mixture shaken for several minutes until the oil had all disappeared, the silver appearing as insoluble silver chloride. The liberated mono-ethanol amine in the mixture was titrated with normal hydrochloric acid solution using methyl orange as indicator. The silver chloride was collected by filtration, washed with distilled water, dried and weighed. The titration required 22.5 ml. of hydrochloric acid and the silver chloride weighed 1.6205 grams corresponding to the formula $Ag(HOCH_2CH_2NH_2)_2$—Cl for the compound.

EXAMPLE 5

Qualitative solubility determinations in mono-ethanol amine were made using silver chloride, silver bromide, silver iodide, silver nitrate, silver sulphate, silver phosphate, silver acetate, and silver lactate. The compounds were all soluble in the amine. The experiment was repeated using 2-amino-isobutanol. In this instance also, all of the silver salts tested were found to be soluble in the amine. Similar results are obtained using mono-butanol amine and propanol amine. The solutions of these salts in the respective amines have properties similar to those described for the compound of silver chloride and mono-ethanol amine in Example 2. Insoluble precipitates are, however, not formed upon dilution with water when the silver salt used is itself water-soluble.

EXAMPLE 6

Ten per cent solutions of several silver salts in mono-ethanol amine were prepared and, after standing one hour, were diluted with water to a concentration of one per cent by weight of the silver salt. The phenol coefficients of the solutions were determined by the method of the Food and Drug Administration. (Circular 198, U. S. Department of Agriculture (1931)). The values obtained using different silver salts are recorded in the accompanying Table II.

Table II

| Silver salt used: | Phenol coefficient |
|---|---|
| Silver nitrate | 24 |
| Silver chloride | 21 |
| Silver bromide | 2 |
| Silver iodide | 5 |

The solutions containing silver halides were non-cauterizing and non-staining to human skin. They were stable on storage and showed no tendency toward sedimentation. Data obtained in similar manner using a one per cent aqueous solution of silver nitrate without the ethanol amine were erratic due to precipitation or occlusion of a silver compound by reaction with constituents of the broth. No reliable value was obtained.

A ten per cent aqueous solution of mono-ethanol amine and an aqueous suspension of silver chloride were each substantially non-germicidal.

EXAMPLE 7

A ten-gram sample of surgical gauze was soaked for five minutes in twenty-five milliliters of a solution containing one per cent of silver chloride prepared as in Example 6. The gauze was then removed from the solution and washed three times with water. The unabsorbed solution and wash waters were combined. These had a volume of about three hundred milliliters and were found to contain 200 milligrams of silver, calculated as silver chloride. This indicated that the gauze contained not more than fifty milligrams, or about one-half per cent of its weight, of silver calculated as the chloride.

Upon drying the gauze, it was slightly discolored and a part of it was bleached by immersion for five minutes in dilute sodium hypochlorite solution. The bleached portion was rinsed thoroughly and dried and was then perfectly white. Pieces of both bleached and unbleached gauze were placed on agar plates inoculated with *Staphylococcus aureus* and the cultures incubated. Clear zones three to four millimeters wide were apparent around both samples of gauze. No clear zone was observed around a piece of untreated gauze on an agar plate treated in the same manner.

Pieces of the bleached and unbleached treated gauze were placed on sterile agar plates and the plates incubated for several hours. No bacterial growth was noted around the pieces of cloth. A piece of the untreated gauze when tested in the same manner caused a luxuriant growth of microorganisms as evidenced by cloudiness in the agar for several millimeters around the piece. This sterility test shows that the treated pieces of gauze even after several hours exposure to the air do not become actively contaminated with microorganisms.

EXAMPLE 8

A sixteen-gram sample of a herringbone twill cloth was soaked for five minutes in forty milliliters of a one per cent aqueous silver chloride composition prepared as in Example 6. The excess liquid was poured off and the cloth washed several times with separate one hundred milliliter portions of water. The excess treating fluid and wash waters when combined and analyzed were found to contain 165 milligrams of silver calculated as silver chloride. This indicates a deposit on the cloth of 35 milligrams, or 0.2 per cent of the weight of the cloth, of silver calculated as silver chloride.

The dry, treated cloth was substantially unaltered in appearance and texture when compared with the untreated cloth. When tested for antiseptic properties after several days exposure to the air as in Example 7, there was a clear band, several millimeters wide, around the sample of cloth on the inoculated plate. A sterility test, carried out as in Example 7, gave no sign of growth of microorganisms in the sterilized agar immediately around the test sample.

EXAMPLE 9

Filter papers were soaked in a solution prepared by the method of Example 6 containing 0.5 per cent silver chloride. After five minutes soaking, the papers were removed from the solution and washed first with dilute sodium chloride solution and then with water. They were then bleached by soaking in a dilute solution of sodium hypochlorite and finally rinsed and dried. Paper towels, paper napkins and paper handkerchiefs were treated in the same manner. With few exceptions, the finished products were unstained by the treatment. In some instances partial disintegration of the paper articles occurred due to lack of wet strength of the article. Each of the treated paper articles was found to be sterile and to have antiseptic properties when tested by the methods of Example 7.

EXAMPLE 10

A ten per cent solution of silver chloride in mono-ethanol amine was prepared. One part by volume of this solution was mixed with nine parts of a compounded natural rubber latex. No coagulation of the latex was noted even after several weeks. Rubber goods, such as toys, gloves, catheters, drain tubes, and the like, were prepared from the treated latex by the customary method of dipping and coagulating. The formed articles were then leached with water and dried. When tested on agar plates, after exposure to the air, as described in Example 7, they were found to be sterile and to have distinct antiseptic properties.

EXAMPLE 11

One part by volume of a ten per cent solution of silver chloride in mono-ethanol amine was mixed with nine parts of a compounded natural rubber latex. A telephone cover was prepared by dipping a telephone receiver into the mixture followed by the customary coagulating dip. The cover was stripped from the receiver, leached with water for several hours and dried. It was then exposed to the air for about two weeks. Test pieces of the cover were then placed on both inoculated and sterilized agar plates as described in Example 7. The test pieces were found to be both sterile and germicidal.

EXAMPLE 12

One hundred grams of powdered calcium carbonate was stirred with 300 milliliters of water. After stirring for five minutes, twenty milliliters of a ten per cent solution of silver chloride in monoethanol amine was added slowly. After an additional five minutes stirring, one hundred milliliters of a twenty per cent aqueous solution of sodium chloride was added and stirring continued for an additional five minutes. The mixture was then filtered and the filter cake washed thoroughly with water and dried. Thirty-three grams of the dried product was incorporated as the abrasive in one hundred twenty-five grams of a toothpaste prepared using a conventional formula. The finished toothpaste was found to be both sterile and antiseptic when tested according to the methods given in Example 7.

EXAMPLE 13

One hundred grams of powdered magnesium oxide was stirred with 900 milliliters of water and the mixture then treated exactly as described for the calcium carbonate suspension in Example 12. The washed and dried magnesium oxide obtained was incorporated as the abrasive in a conventional toothpaste formula. The final toothpaste was found to be both sterile and antiseptic when examined by the methods described in Example 7.

EXAMPLE 14

One hundred grams of finely powdered talcum was stirred with 300 milliliters of water and the mixture then treated exactly as described for the calcium carbonate suspension in Example 12. The washed and dried talcum was found to be both sterile and antiseptic when examined by the methods described in Example 7. This talcum represents the base of a sterile and antiseptic face powder.

EXAMPLE 15

A fifty-five gram sample of diaper cloth was wetted with water and soaked for five minutes in a mixture of eighty milliliters of water and twenty milliliters of a solution containing one per cent silver chloride and ten per cent mono-ethanol amine prepared as in Example 6. The cloth was then removed from the solution and immersed for three minutes in a sodium hypochlorite solution prepared by diluting ten milliliters of commercial five per cent sodium hypochlorite solution with ninety milliliters of water. The cloth was then removed from this solution, washed thoroughly with water and dried. Test pieces of the dry cloth were examined after exposure for several hours to the air by the methods described in Example 7 and were found to be both sterile and antiseptic.

EXAMPLE 16

A piece of a natural sponge was treated with a solution containing one per cent of silver chloride and ten per cent mono-ethanol amine prepared as in Example 6. The treated sponge was then rinsed repeatedly with water and dried. The dried sponge was then examined after prolonged exposure to air by the methods described in Example 7 and found to be both sterile and antiseptic.

Rubber and cellulose sponges are rendered sterile and antiseptic by the method described in the preceding paragraph.

EXAMPLE 17

One hundred grams of zinc oxide was stirred with 300 milliliters of water and the mixture then treated exactly as described for the calcium carbonate suspension in Example 12. One part of this product was mixed with 9 parts of a compounded natural rubber latex. Rubber goods, such as toys, gloves, catheters, drain tubes, and the like, were prepared from this latex by the customary method of dipping and coagulating. The formed articles were then leached with water and dried. When tested on agar plates after exposure to the air as described in Example 7, they were found to be sterile and to have distinct antiseptic properties.

EXAMPLE 18

Ten grams of zinc oxide, prepared according to Example 17, were mixed with 10 grams of a liquid composed of 60% phosphoric acid, 30% water, and 10% aluminum phosphate and the mixture allowed to stand and harden. The hardened mixture represented a dental filling material which proved to be sterile and antiseptic when tested according to the methods of Example 7.

Fifty grams of aluminum silicate were stirred with 200 milliliters of water and the mixture treated as described for the calcium carbonate suspension in Example 12. Ten grams of the treated aluminum silicate were mixed with 10 grams of a liquid composed of 50% phosphoric acid, 40% water and 10% aluminum phosphate and the mixture allowed to stand and harden. The hardened mixture represented a dental filling material which proved to be sterile and antiseptic when tested according to the methods of Example 7.

EXAMPLE 19

Seventy grams of soap powder were mixed with 30 grams of the talcum powder prepared according to Example 14. This soap powder was found to be both sterile and antiseptic when tested according to the methods given in Example 7.

Ninety grams of stearic acid were melted and 10 milliliters of of a 10% solution of silver chloride in ethanolamine were added slowly with stirring. The cooled solidified mixture was powdered and tested according to the methods given in Example 7. The soap was found to be both sterile and antiseptic.

I claim:

1. A germicidal complex compound having an empirical formula corresponding to one chemically equivalent proportion of a silver salt and at least two molecular proportions of a monohydroxy-monoamino-alkane formed by mixing a silver salt with a substantially anhydrous monohydroxy-monoamino-alkane at a temperature below about 50 degrees centigrade.

2. A compound as claimed in claim 2 which is soluble in an aqueous solution of the monohydroxy-monoamino-alkane.

3. A compound as claimed in claim 1 wherein the silver salt is a normally water-insoluble salt.

4. A compound as claimed in claim 1 wherein the silver salt is silver chloride.

5. A compound as claimed in claim 1 wherein the monohydroxy-monoamino-alkane is 1-hydroxy-2-amino-ethene.

6. A germicidal liquid comprising as essential ingredients thereof a monohydroxy-monoamino-alkane and a complex compound having an empirical formula corresponding to one chemically equivalent proportion of a silver salt and at least two molecular proportions of a monohydroxy-monoamino-alkane and formed by mixing a silver salt with a substantially anhydrous monohydroxy-monoamino-alkane at a temperature below about 50 degrees centigrade.

7. A liquid as claimed in claim 6 wherein the silver salt is silver chloride.

8. A liquid as claimed in claim 6 wherein the monohydroxy-monoamino-alkane is 1-hydroxy-2-amino-ethane.

9. The method which comprises dissolving a silver salt in a substantially anhydrous monohydroxy-monoamino-alkane to form a germicidal reaction product of the salt and amine.

10. The method which comprises dissolving one chemically equivalet proportion of a silver salt in at least two molecular proportions of a substantially anhydrous monohydroxy-monoamino-alkane to form a germicidal reaction product of the salt and the amine.

11. The method for forming a germicidal composition which comprises mixing a silver salt and a substantially anhydrous monohydroxy-monoamino-alkane to form a substantially homogeneous liquid and maintaining the temperature of the liquid at from about 10 to about 50 degrees centigrade for at least five minutes.

12. The method of claim 10 wherein the silver salt is silver chloride.

13. The method of claim 10 wherein the monohydroxy-monoamino-alkane is 1-hydroxy-2-amino-ethane.

14. The method for forming an aqueous germicidal solution which comprises mixing a water-insoluble silver salt and a substantially anhydrous monohydroxy-monoamino-alkane to form a substantially homogeneous liquid containing an excess of unreacted amine, maintaining the liquid at a pre-determined temperature below about 50 degrees centigrade for at least five minutes, and subsequently diluting the liquid with water to form a clear aqueous solution.

15. The method for treating an article to render it substantially self-sterilizing which comprises dissolving a water-insoluble silver salt in a substantially anhydrous monohydroxy-monoamino-alkane at a temperature below about 50 degrees centigrade to form a germicidal reaction product of the salt and amine, wetting the article to be treated with a solution of the said reaction product in an aqueous monohydroxy-monoamino-alkane, and subsequently treating the wetted article to precipitate thereon a water-insoluble silver compound in highly germicidal form.

16. The liquid composition formed by mixing one equivalent proportion of a silver salt with at least two molecular proportions of a substantially anhydrous monohydroxy-monoamino-alkane at a temperature below about 50 degrees centigrade.

17. The homogeneous liquid composition formed by mixing one molecular proportion of silver chloride with at least two molecular proportions of substantially anhydrous 1-hydroxy-2-amino-ethane at a temperature below about 50 degrees centigrade.

WALTER M. FUCHS.

(References on following page)

REFERENCES CITED

The following references are of record in the file of this patent:

UNITED STATES PATENTS

| Number | Name | Date |
|---|---|---|
| 900,835 | Dodsworth | Oct. 13, 1908 |
| 1,418,610 | Arent | June 6, 1922 |
| 1,659,135 | Curtin | Feb. 14, 1928 |
| 2,099,888 | Hill | Nov. 23, 1937 |
| 2,176,508 | Neu | Oct. 17, 1939 |
| 2,247,339 | Robinson | June 24, 1941 |
| 2,396,514 | Kreidl | Mar. 12, 1946 |
| 2,459,896 | Schwartz | Jan. 25, 1949 |

FOREIGN PATENTS

| Number | Country | Date |
|---|---|---|
| 8,429 of 1893 | Great Britain | Mar. 3, 1894 |
| 10,845 of 1900 | Great Britain | Apr. 20, 1891 |
| 379,677 | Great Britain | Aug. 30, 1932 |

OTHER REFERENCES

"Pharmacological Basis of Therapeutics," by Goodman and Gilman, pages 856, 857, 860, published by Macmillan Co. N. Y., N. Y., 1941.

Chemical Abstracts, vol. 36 (1942), col. 2258, Abstract of article by Garreau in Bull. Soc. Chem. (Original article not available in Pat. Off. Library.)

Fischer "Wissenschaftliche Veroffent-lichungen aus dem Siemens-Konzern," vol. 4 (1925), pages 171 and 187.